May 27, 1952 C. A. BERGFORS 2,598,491

PEAKED PULSE GENERATOR

Filed Dec. 29, 1948

INVENTOR
Carl A. Bergfors
BY
Dwight D. Mooney
AGENT

Patented May 27, 1952

2,598,491

UNITED STATES PATENT OFFICE 2,598,491

PEAKED PULSE GENERATOR

Carl A. Bergfors, Yonkers, N. Y., assignor to International Business Machines Corporation, New York, N. Y., a corporation of New York Application December 29, 1948, Serial No. 67,884

2 Claims. (Cl. 250—27)

This invention relates to pulse generators and more particularly to a circuit for producing a sharply defined pulse suitable for use as a time marker and the like.

The generation of sharply defined pulses at regular intervals by an electronic circuit becomes more difficult as the interval between pulses is decreased or the repeat frequency of the pulses increased. This difficulty is caused, among other things, by the increased effects of the stray capacitance of the circuit and the increased effects of the inter-electrode capacitance of the tubes used.

It is an object of this invention to provide an electronic circuit for producing a series of sharply defined pulses spaced at regular time intervals wherein the above difficulty is substantially eliminated.

Another object is to provide a circuit for producing a series of sharply defined pulses having a repeat frequency twice that of the input waves to the circuit.

A further object is to provide a circuit for changing a series of positive and negative pulses into a series of tangentially disposed positive pulses and utilizing the substantially tangential portions thereof to produce a series of sharply defined marker pulses.

A still further object is to provide a circuit for producing a series of sharply defined marker pulses from a series of pulses wherein the marker pulses are not transferred through an electronic stage following their generation.

Other objects of the invention will be pointed out in the following description and claims and illustrated in the accompanying drawings, which disclose, by way of examples, the principle of the invention and the best mode, which has been contemplated, of applying that principle.

Figure 1:
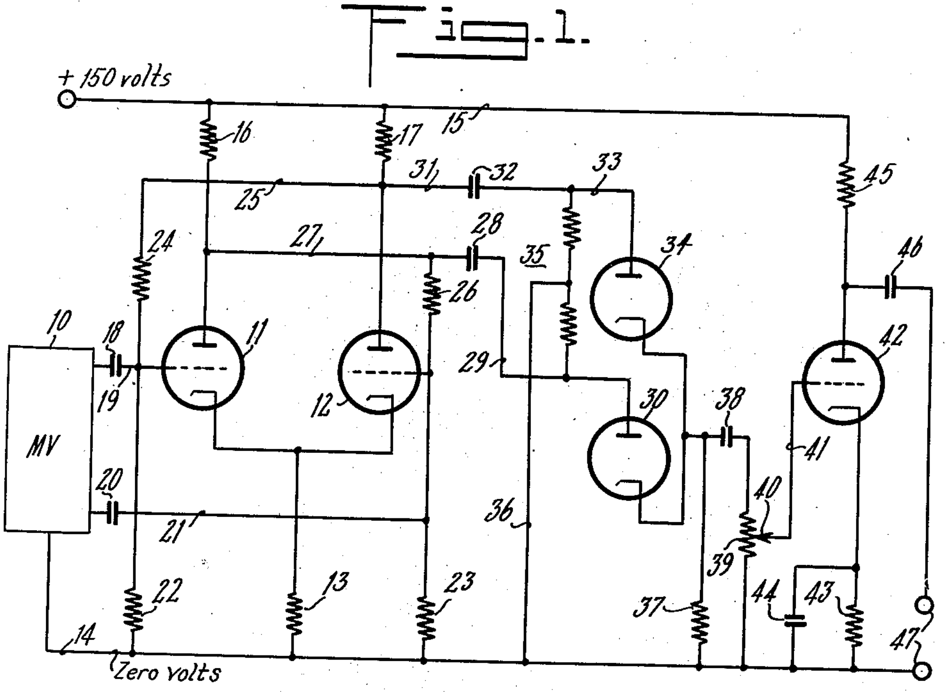
Fig. 1 is a circuit diagram of a preferred embodiment of the invention.

Referring more particularly to Fig. 1, a multivibrator type oscillator 10 supplies asymmetrical positive and negative half waves to operate the circuit. A multivibrator was chosen as the oscillator because its output wave form at high frequencies approaches a square wave having curved corners. Such a wave form, while it facilitates the production of sharply defined pulses, is not essential to such production and if desired a sine wave source may be used.

The multivibrator output is applied to a symmetrical amplifier comprising tubes 11 and 12 of the twin-triode 6SC7 type, cross-connected, as shown, to produce symmetrical half waves. The cathodes of the tubes 11 and 12 are connected through a common resistor 13 of 5000 ohms to a zero volt line 14 and the plates are connected to a plus 150 volt line 15 through resistors 16 and 17, respectively, each of 33,000 ohms.

The multivibrator 10 is connected to the control grids of the tubes 11 and 12, through capacitor 18 of 0.02 microfarad and conductor 19, and through capacitor 20 of 0.02 microfarad and conductor 21, respectively. The control grids of the tubes 11 and 12 are connected to the line 14 through bias resistors 22 and 23, respectively, each of 50,000 ohms. The control grid of the tube 11 is connected through a resistor 24 of 100,000 ohms and a conductor 25 to the plate of the tube 12. The control grid of the tube 12 is connected through a resistor 26 of 100,000 ohms and a conductor 27 to the plate of the tube 11.

The symmetrical half waves of the amplifier are applied to a full wave rectifier comprising two diodes 30 and 34. The plate of tube 11 of the amplifier is connected via conductor 27, a capacitor 28 of 0.02 microfarad and a conductor 29, to the plate of diode 30 while the plate of tube 12 of the amplifier is connected through a conductor 31, a capacitor 32 of 0.02 microfarad and a conductor 33 to the plate of diode 34. The diodes actually employed are type 6A6.

A resistor 35 of 1.0 megohm is connected between the plates of the diodes 30 and 34 and its midpoint is connected by a conductor 36 to the zero volt line 14.

Figure 3:
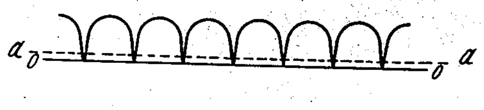

The wave forms of amplifier tubes 11 and 12, it is to be noted, are 180 degrees out of phase. The positive halves only of the waves produced by tube 11 are passed by rectifier 30 and the 180 degree out of phase positive halves of the waves produced by amplifier tube 12 are passed by rectifier 34. Thus, the series of positive pulses, as represented in Fig. 3 are produced at the output of the complete rectifier.

The cathodes of diodes 30 and 34 are connected together and to the zero volt line 14 through a 1.0 megohm bias resistor 37. The output of the diodes 30 and 34 is conveyed through a capacitor 38 of 0.02 microfarad connected to the diode cathodes and to one end of a 1.0 megohm potentiometer 39, connected at its other end to the zero volt line 14. The adjustable arm 40 of the potentiometer is connected by a conductor 41 to the control grid of the clipper amplifier tube 42 which is illustrated as a triode but may comprise a tetrode, pentode or beam power tube, as desired. The cathode of the tube 42 is connected to the zero volt line 14 through parallel conected resistor 43 and capacitor 44 of 1200 ohms and 0.02 microfarad, respectively. The plate of the tube 42 is connected to the plus 150 volt line 15 through a load resistor 45 of 33,000 ohms.

The tube 42 is of the 6SC7 type but may be of any other suitable type. The output of the tube 42 is conveyed through a capacitor 46 of 0.05 microfarad connected between the plate of the tube 42 and one terminal of a pair of output terminals 47. The other output terminal is connected to the zero volt line 14.

Figure 2:
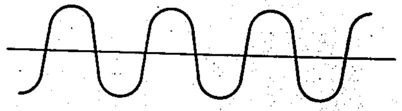
Figs. 2 and 3 illustrate the wave forms occurring at certain places in the circuit of Fig. 1.

The multivibrator 10 supplies asymmetrical pulses of opposite polarity to the control grids of tubes 11 and 12. The pulses supplied to each control grid are alternately positive and negative. When tube 11 is conductive, tube 12 is non-conductive and vice-versa. These tubes are connected as shown to operate as symmetrical amplifiers. This symmetrical wave form is shown in Fig. 2 and is applied to the plates of the diodes 30 and 34 from the plates of tubes 11 and 12, respectively. Since tubes 11 and 12 are operated in opposite phase relationship, the waves applied to the plates of diodes 30 and 34 are likewise in opposite phase relationship.

Hence, diodes 30 and 34 operate as a full wave rectifier to produce a series of positive pulses, each arranged in tangential relationship with the pulse immediately preceding and following. These positive pulses are transferred through capacitor 38 and appear across potentiometer 39 and are shown in Fig. 3.

It is clear from Fig. 3 that at the zero potential line *o—o* the slope of the tangential portions of the positive pulses is infinite and that at line *a—a*, slightly above the lines *o—o*, the slope of the tangential portions is substantially infinite.

The novel marker pulse circuit of the present invention utilizes these tangential positive pulses of Fig. 3 in a novel manner.

The substantially tangential portions of the pulses between the lines *o—o* and *a—a* are used to produce the sharply defined marker pulses which appear across terminals 47.

The novel means of the present invention produces the marker pulses in a simple and dependable manner in that the unwanted portions of the waves, shown in Fig. 3, are clipped off by the action of the clipper amplifier tube 42. Potentiometer 39 provides a convenient means for adjusting the amplitude of the output pulses to any desired value.

Figure 4:
Fig. 4 illustrates the sharply defined marker pulses appearing across the output terminals of the circuit of Fig. 1.

The unclipped signal which remains at the grid of tube 42 is represented by the portion of the wave train between lines *a—a* and *o—o* of Fig. 3 which consists of sharp positive pulses of relatively low amplitude. These positive pulses are inverted and amplified to negative pulses of large amplitude by action of tube 42. Thus extremely sharp negative marker pulses of relatively large amplitude are caused to appear across the output terminals 47. These marker pulses are illustrated in Fig. 4 and are ideal for use with a cathode ray oscilloscope or any other application where the use of pulses produced by exponentially timed voltage increase or decrease is undesirable.

While there have been shown and described and pointed out the fundamental novel features of the invention as applied to a preferred embodiment, it will be understood that various omissions and substitutions and changes in the form and details of the circuit illustrated and in its operation may be made by those skilled in the art, without departing from the spirit of the invention. It is the intention, therefore, to be limited only as indicated by the scope of the following claims.

What is claimed is:

1. In an electronic circuit for producing vertical pulses at preselected time intervals; a source of electrical waves of preselected frequency having asymmetrical positive and negative components; an amplifier comprising two grid controlled tubes with the control grid of one tube connected to the plate of the other tube and vice versa; a connection from said source to each tube of said amplifier for applying said electrical waves thereto, said amplifier producing from said asymmetrical waves a symmetrical wave having positive and negative components; a full wave rectifier comprising two electron tubes; a connection from each tube of said rectifier to said amplifier to transfer said symmetrical wave to said rectifier so that said rectifier produces a series of tangential positive pulses; a potentiometer commonly connected to the tubes of said rectifier; a connection from said potentiometer to said amplifier to energize the latter, said amplifier passing only the tangential portions of said series of positive pulses to thus produce a series of sharp pulses substantially devoid of exponential portions and having twice the repeat frequency of said asymmetrical wave.

2. In an electronic circuit for producing substantially vertical negative pulses at preselected uniform time intervals, a source providing substantially square voltage waves of preselected frequency; a full wave rectifier connected to be conductive in response to said source to produce a series train of substantially tangential positive pulses; a grid controlled clipper amplifier conductive to saturation in response to a voltage represented by the highest voltage value of the tangential portions of said pulses for producing such vertical negative pulses substantially devoid of exponential portions, and circuit means for applying said positive pulses to the control grid of said amplifier to produce said negative pulses.

CARL A. BERGFORS.

REFERENCES CITED

The following references are of record in the file of this patent:

UNITED STATES PATENTS

| Number | Name | Date |
|---|---|---|
| 2,226,459 | Bingley | Dec. 24, 1940 |
| 2,289,987 | Norton | July 14, 1942 |
| 2,412,542 | Smith | Dec. 10, 1946 |
| 2,452,549 | Cleeton | Nov. 2, 1948 |
| 2,486,789 | Lakatos | Nov. 1, 1949 |
| 2,498,900 | Schoenfeld | Feb. 28, 1950 |